United States Patent
Leighton et al.

(10) Patent No.: US 9,163,487 B2
(45) Date of Patent: Oct. 20, 2015

(54) DEVICE FOR APPLYING AN EXPANDABLE SKIRT HAVING APPLICATION DIAMETER CONTROL UPON ADVANCE

(75) Inventors: James Leighton, L'hermitage (FR); Frédéric Nicolas, Rennes (FR); Yoann Riou, Laille (FR); Benjamin Saltel, Cintre (FR); Jean-Louis Saltel, Le Rheu (FR); Gwenaël Tanguy, Pace (FR)

(73) Assignee: Saltel Industries (FR)

( * ) Notice: Subject to any disclaimer, the term of this patent is extended or adjusted under 35 U.S.C. 154(b) by 651 days.

(21) Appl. No.: 13/508,127

(22) PCT Filed: Oct. 22, 2010

(86) PCT No.: PCT/EP2010/065972
§ 371 (c)(1),
(2), (4) Date: May 4, 2012

(87) PCT Pub. No.: WO2011/054687
PCT Pub. Date: May 12, 2011

(65) Prior Publication Data
US 2012/0211222 A1 Aug. 23, 2012

(30) Foreign Application Priority Data
Nov. 9, 2009 (FR) ..................................... 09 57899

(51) Int. Cl.
*E21B 43/10* (2006.01)
*E21B 29/10* (2006.01)
*F16L 55/165* (2006.01)

(52) U.S. Cl.
CPC ............... *E21B 43/105* (2013.01); *E21B 29/10* (2013.01); *E21B 43/10* (2013.01); *F16L 55/1653* (2013.01); *F16L 55/1657* (2013.01)

(58) Field of Classification Search
CPC .............................. E21B 43/103; E21B 43/105
USPC ................ 166/208, 207, 380, 277; 72/31.06, 72/370.06–370.08, 393
See application file for complete search history.

(56) References Cited

U.S. PATENT DOCUMENTS 958,517 A * 5/1910 Mettler .................... 166/217
3,419,080 A * 12/1968 Lebourg .................. 166/207

(Continued)

FOREIGN PATENT DOCUMENTS

EP    1657365 A2    5/2006
FR    2915264 A1   10/2008

(Continued)

OTHER PUBLICATIONS

International Search Report for PCT/EP2010/065972 dated Feb. 8, 2011.

(Continued)

*Primary Examiner* — Giovanna C Wright
*Assistant Examiner* — Tara Schimpf
(74) *Attorney, Agent, or Firm* — Lerner, David, Littenberg, Krumholz & Mentlik, LLP

(57) ABSTRACT

The present invention relates to a device for laying an expansible lining in a conduit. The device may include a patch having an initial diameter less than that of the conduit, and the patch may be configured to deform by radial expansion beyond an elastic limit to an expanded diameter such that it may contact a wall of the conduit. The device may also include an expander tool axially displaceable inside the patch, and the expander tool may be configured to cause the radial expansion of the patch to an expanded diameter. The device may also include a checking member mounted in proximity to the expander tool. A section of the checking member may be calibrated so that the checking member and the expander tool are capable of passing freely inside the patch when the patch is properly expanded, and the checking member and the expander tool are unable to pass inside the patch when the patch is improperly expanded.

17 Claims, 3 Drawing Sheets

(56) References Cited

U.S. PATENT DOCUMENTS

| | | | | |
|---|---|---|---|---|
| 3,477,506 A | * | 11/1969 | Malone | 166/207 |
| 7,500,389 B2 | * | 3/2009 | Green et al. | 73/152.57 |
| 7,543,639 B2 | * | 6/2009 | Emerson | 166/277 |
| 2004/0168796 A1 | | 9/2004 | Baugh et al. | |

FOREIGN PATENT DOCUMENTS

| | | |
|---|---|---|
| FR | 2927650 A1 | 8/2009 |
| GB | 2398312 A | 8/2004 |
| WO | 2008151316 A2 | 12/2008 |

OTHER PUBLICATIONS

Inflatable Packers Int'l PTY LTD:"Slim-line re-lining", Announcement inflatable packers international, XX, XX, Jun. 30, 2000, pp. 4pg-s, XP003017478.

* cited by examiner

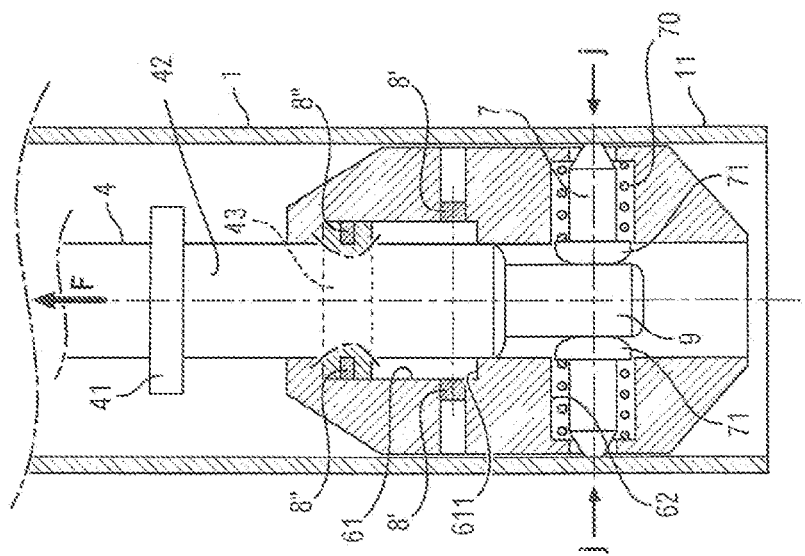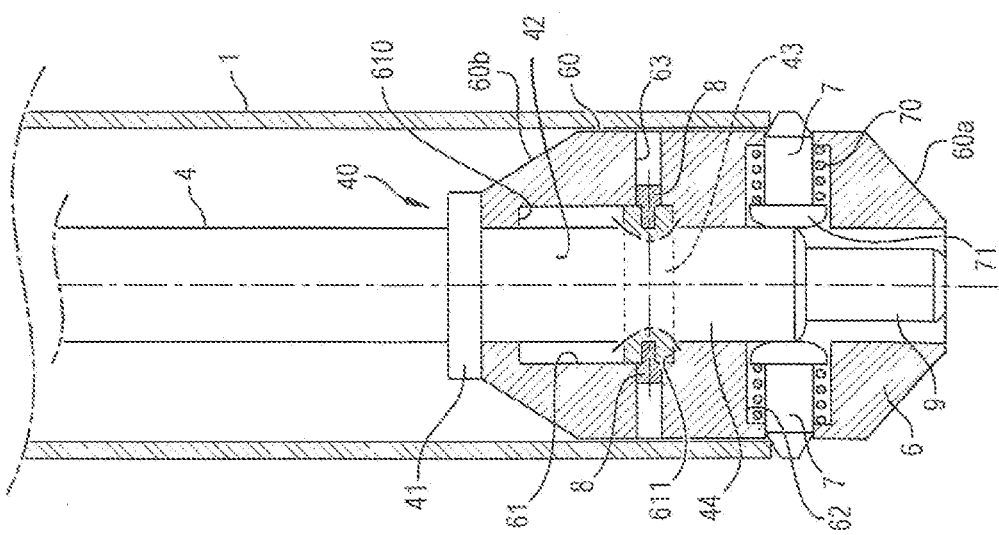

DEVICE FOR APPLYING AN EXPANDABLE SKIRT HAVING APPLICATION DIAMETER CONTROL UPON ADVANCE

CROSS REFERENCE TO RELATED APPLICATIONS

The present application is a national phase entry under 35 USC §371 of International Application No. PCT/EP2010/065972, filed Oct. 22, 2010, published in French, which claims priority from French Patent Application No. 09 57899 filed Nov. 9, 2009, all of which are incorporated herein by reference.

The present invention relates to a device for laying an expansible lining in a well or in a conduit, with checking of the laying diameter during downward movement.

This device is applied to the lining of a well or of a conduit, for example a casing, having a portion to be treated in order to make it leakproof, notably for repairing it and/or plugging it.

The invention is notably applied to the field of water or oil production.

For example, in the field of the production of water, water catchment wells bored in the ground generally include a continuous lining, or casing, made by a succession of cylindrical steel tubes of relatively short length (of the order of 6 m to 12 m for example) welded to each other, end to end. With the casing, once it is cemented against the natural wall of the well, a seal may be obtained over the whole height of the well, in order to avoid any contamination between the various soil layers.

In the course of time, it happens that a portion, or even the totality of the wall of the casing has to be made leakproof, notably when it has been degraded, for example by premature wear and/or corrosion, or when the perforations intended for letting through water have to be plugged, in particular because they produce undesirable fluids which may penetrate inside the casing.

For this purpose, it is known how to position inside the casing a lining with a slightly smaller diameter, called a patch, having the desired length.

The patch will cover the area to be sealed.

It is attached against the internal face of the casing, either by cementing, or by radial expansion which makes the material creep beyond its elastic deformation limit, so that the outer surface of the patch is flattened and intimately applied against the internal surface of the casing.

This expansion is generally achieved by means of an expander tool called a rigid "cone", such as a mandrel (optionally rotary) with rollers or with peripheral fingers which may be displaced radially outwards, or by means of a tool of the inflatable bladder kind called a "packer", with a flexible and elastically deformable tubular membrane (in rubber or in elastomeric material).

The state of the art in this matter may be illustrated by the technical document of Jun. 30, 2000 of the Australian Corporation IPI (Inflatable Packers International Pty Ltd) entitled "Slim-line Re-lining", as well as by patent application EP-A 1 657 365.

The device operates "stepwise", with successive phases for inflating the packer, causing expansion of a section of the patch, for deflating, for axially displacing the deflated packer by the length of one step, again inflating causing expansion of the next section of the patch, and so forth over the whole length of the patch.

The deflated tool is then withdrawn axially.

The main object of the present invention is to improve the prior art with a device with which quality work may be achieved, i.e. by preventing the advance of the tool from the moment that the previous expansion phase has not been properly achieved (incomplete or irregular expansion of the patch).

A secondary object of the invention is to be able to lower and position the patch in the well or in the conduit, facing the area to be treated, while the packer is deflated (or slightly inflated).

According to known techniques, the patch is retained by friction by means of the pre-inflated packer, during its setting into place. The membrane of the packer should therefore support the weight thereof during its descent into the well. Now this weight is relatively high.

As an indication, a cylindrical steel patch of a length of 12 meters having an outer diameter of 200 mm and a wall thickness of 4 mm has a mass of the order of 250 kg.

Its retention by the packer therefore induces on the membrane of the latter a non-negligible axial force, which requires that a suitable and costly structure be provided, while the packer is essentially designed for developing radial forces, and not for supporting axial forces.

An object of the invention is therefore to propose a device allowing the patch to be supported during its descent and its axial positioning in the well or the conduit independently of the packer, the function assigned to the latter being thereby limited to the radial expansion of the patch, once this positioning has been achieved.

On the other hand, there must also be the possibility of withdrawing this supporting device in the case of a problem, even if these means are located below the patch.

Indeed, it is important that no mechanical element falls down to the bottom of the well or remains blocked under or inside the patch, since this would risk impeding subsequent operations and/or compromising proper exploitation of the well.

Thus, the present invention relates to a device for laying an expansible lining in a well or in a conduit, for example a casing, having a portion to be repaired and/or to be plugged, by means of a metal tubular lining or patch, the initial diameter of which is less than that of the well or of the conduit, and which is deformable by radial expansion beyond its elastic limit so that it may firmly and intimately be applied against the wall of the well or of the conduit, this device including an axially displaceable expander tool inside the patch, from one end to the other of the latter, and capable of gradually causing radial expansion of the patch over the whole of its length.

It is remarkable that it is provided with a checking member which is mounted in proximity to the expander tool, just at the rear of the latter if the direction of its displacement is considered, and the section of which is calibrated so that the checking member is capable of freely passing into the inside of the patch when the latter is properly expanded, accompanying in this case the advance of the tool, while on the contrary it is unable to pass into the inside of the patch when the latter is improperly expanded, which then blocks the advance of the tool.

Thus, in the case of an interruption in the progression of the checking member, the operator is immediately informed about the problem, and may take steps suitable for the situation, instead of continuing to work in an inappropriate manner.

For example he/she will proceed with moving up the expander tool by one step or two, and will then cause again expansion in order to "re-expand" the area forming a block.

If the dysfunction persists, it is possible to proceed with withdrawal of the device in order to check it.

According to other advantageous and non-limiting characteristics:

said checking member has a general discoidal, conical or biconical shape with a maximum calibrated diameter Φ;

said diameter Φ is greater than the initial inner diameter of the patch, and slightly smaller than the inner diameter of the expanded patch;

said checking member is crossed by anti-swabbing apertures, preferentially directed axially;

said checking member has a variable diameter, and may be retracted radially so as to be able to pass through a non-expanded portion of the patch when this is necessary;

the expander tool is an inflatable bladder or "packer";

said packer operates "stepwise", with successive phases of inflation/deflation/advance;

said packer includes a supporting member cooperating with the distal edge of the patch, in order to support it during its placement;

said supporting member also ensures centering of the distal end portion of the patch;

said supporting member is provided with retractable supporting fingers, the retraction of which allows it to pass into the patch, even in its portion which is not yet expanded;

said member is connected to the packer through a connecting system capable of causing retraction of the fingers when it is subject to a tensile force which exceeds a given threshold;

said connection system includes frangible pins with calibrated mechanical strength;

said control member, said packer and said supporting member are borne by a common maneuvering rod.

Other features and advantages of the invention will become apparent upon reading the detailed description which follows, of an embodiment.

This description will be made with reference to the appended drawings wherein:

FIG. 3 is an axial longitudinal section detailed view of the member supporting the patch, with its fingers in an active position;

FIG. 4 is a view analogous to FIG. 3, the fingers being in a retracted position, and the device being withdrawn.

Figure 1:
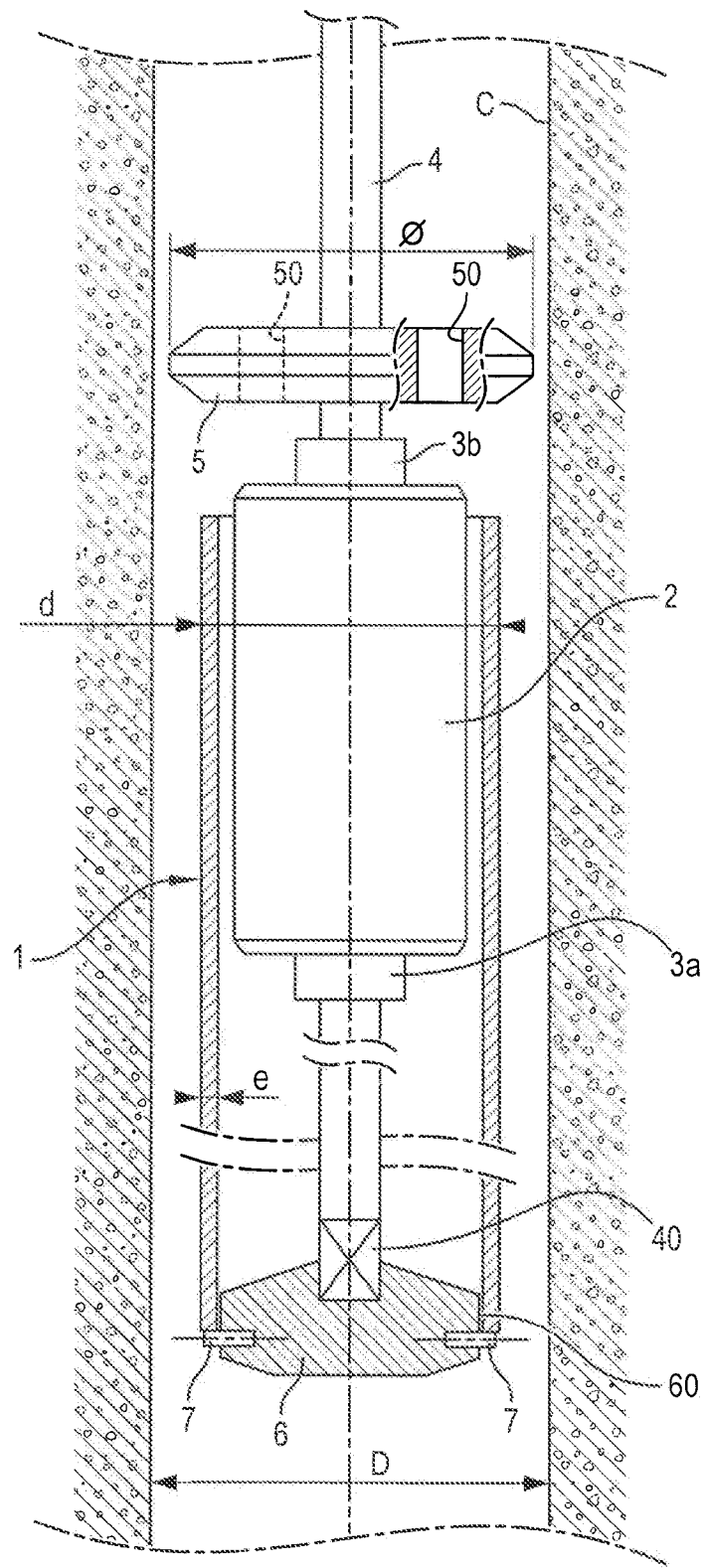
FIG. 1 is a longitudinal axial sectional view of the device inserted into a well, before the beginning of the lining operation.

In the appended FIG. 1, the reference C designates the wall of a well or of a conduit, which is vertical here.

This situation is not mandatory: the well (or the conduit) may be oblique, or even horizontal, but not necessarily rectilinear.

In the whole of the patent application, the term of "proximal" will be used for designating the "head" well side—i.e. in the direction of its aperture—and the term of "distal" for designating the "bottom" well side.

The wall C is cylindrical, of diameter D.

Reference 1 designates an expandable lining—or patch—, which is a cylindrical metal tube, notably in steel, with an outer diameter d and a wall thickness e.

The metal should be both resistant (mechanically and to corrosion) and be sufficiently ductile so as to be able to be suitably expanded.

Reference 2 designates an expander tool (packer), which here is an inflatable cylindrical bladder with distal 3a and proximal 3b terminal endpieces. These endpieces close and retain the ends of the inflatable membrane.

The packer 2 is borne by a tubular maneuvering rod 4.

It is fed in a known way with high pressure hydraulic liquid, compatible with the required deformation degree (which essentially depends on the quality of the metal of the patch, on its wall thickness and on the difference D–d).

At least one of the endpieces, preferably the distal endpiece 3a, is mobile, which may freely slide on the rod 4. Thus, it may move closer to the proximal endpiece 3b in order to accommodate the axial shortening of the packer when it is inflated.

Just above the endpiece 3b, a checking member 5 is mounted, also borne by the rod 4, and immobilized on this rod.

It has the shape of an horizontal disk, preferably having beveled faces and/or a rounded edge, capable of facilitating its penetration and its sliding in the expanded patch.

It is crossed by several axial apertures 50 intended to prevent the "swabbing", effect, which would be capable of impeding its displacement if the well contains a liquid.

According to a feature of the invention, its maximum diameter Φ is greater than the initial diameter d of the patch and very slightly less than the inner diameter D–2e of the expanded patch.

Reference 6 designates the supporting member of the patch 1.

The latter is mounted on the distal end of the rod 4 via a specific connection system 40, symbolized by a rectangle with its diagonals, and the operation of which will be described later on, with reference to FIGS. 3 and 4.

The supporting member 6 is provided with a series of radial fingers 7 used as a support at the lower edge of the patch. It has an outer cylindrical wall 60, the diameter of which corresponds, with slight play, to the inner diameter (d–2e) of the patch 1.

Thus, the member 6 ensures centring of the patch 1 along the longitudinal axis of the well or of the conduit, in the same time supporting it by means of the fingers 7.

This is interesting during the top-to-bottom placement of the device with its patch inside the well or the conduit. Indeed, as this is understood upon examining FIG. 1, the descent of this assembly may be accomplished while the packer 2 is deflated, without its membrane being in contact with the internal surface of the patch; these are the fingers 7 which support alone the weight of the latter.

In certain cases, it may nevertheless be interesting to slightly inflate the packer in order to ensure good immobilization of the patch relatively to the laying device.

When the assembly has been suitably positioned facing the wall portion C, it is proceeded in a known way with deforming the patch 1, by radial expansion, by working stepwise and from top to bottom, with successive phases of inflation/deflation/advance of the packer, as explained above.

As soon as the first step, as the upper portion of the patch is expanded and firmly applied against the wall C, the patch is naturally retained and suspended at this level, so that the subsequent descent of the supporting means 6/7, which move downwards at the same time as the rod which bears them, therefore disengaging from the lower edge of the patch, is not a problem.

Figure 2:
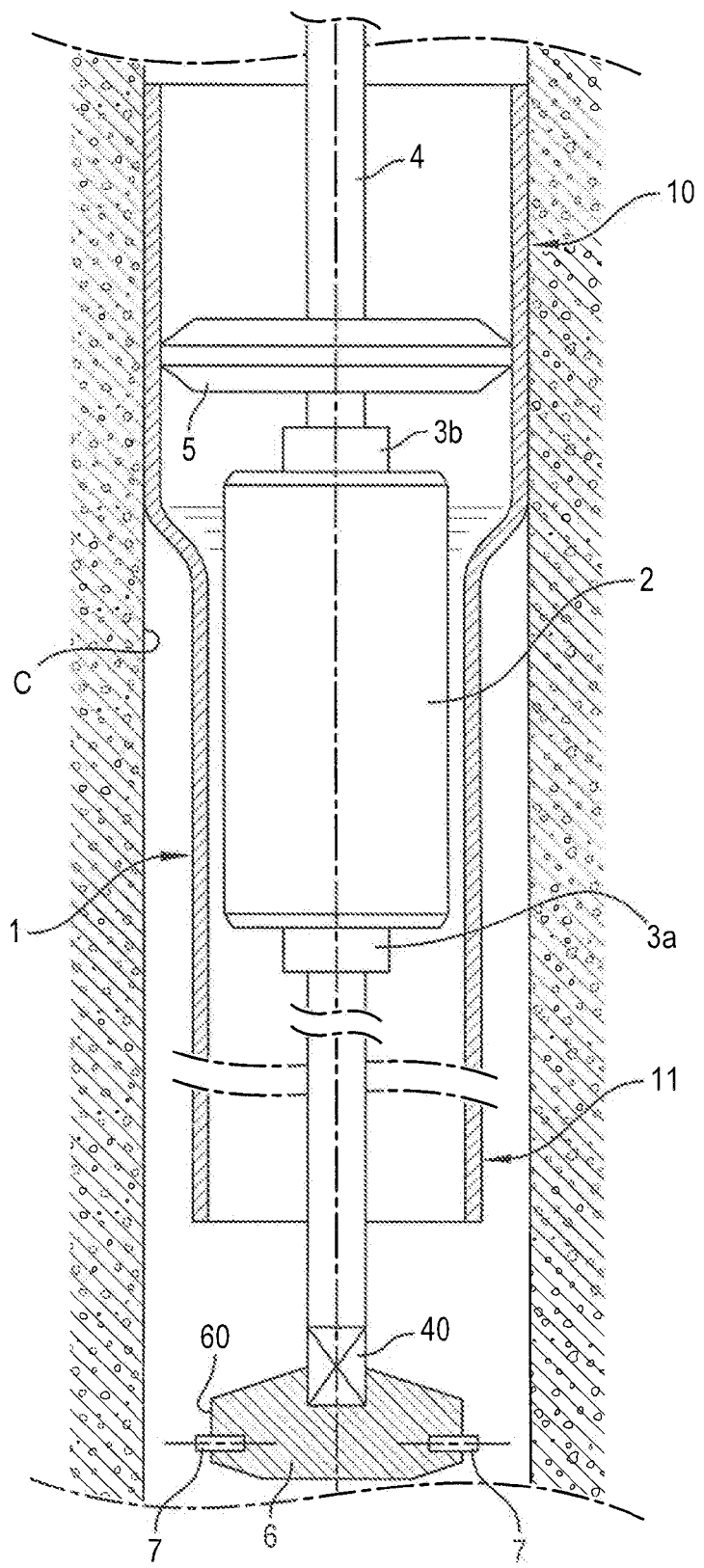
FIG. 2 is a view analogous to the previous one, the device being in the course of a lining operation.

During the different successive working phases, from top to bottom, the discoidal control member 5 penetrates with a slight play into the inside of the portion 10 of the patch 1 which has just been expanded, since its diameter is calibrated for this. This is understood upon examining FIG. 2.

On the other hand, if the flaring of this portion is irregular (not circular) or insufficient, the element 6 cannot pass through, and the progression of the device is therefore blocked.

This generally denotes a problem in the operation of the laying device.

Under these conditions, it may be desirable to then withdraw this device (the packer being deflated), in order to repair it or to replace it.

But the operator will first and preferably proceed with moving the tool upwards by one step or two and will then again cause expansion for "re-expanding" the area forming a block.

In the case of withdrawal, the latter is accomplished by upward traction on the rod 4.

But this implies that the supporting member 6 may also move up, by crossing the portion 11 of the patch 1 which has not been yet expanded. This therefore assumes retraction of the fingers 7 since the latter are included in a circular envelope, the diameter of which is equal to d, or close to d, therefore greater than the inner diameter d–2e of this portion 11.

FIGS. 3 and 4 illustrate a layout with which this result may be achieved.

The member 6 is a massive body with a cylindrical wall 60 and with frusto-conical distal 60*a* and proximal 60*b* faces (forming chamfers capable of facilitating the positioning and limiting friction). It contains a series of radial fingers 7 regularly distributed and mobile along their own axis (therefore perpendicularly to the axis of the cylindrical body). For example, there are four fingers positioned at an angle of 90° from each other, or six fingers positioned at 60°.

These fingers are housed in ad hoc receiving holes 62, formed in the body 6. These are rods with a convex head 71 (located towards the inside of the body 6) and with a frusto-conical end, which normally protrudes outside the body 6, in order to retain the lower edge of the patch, as illustrated in FIG. 3. It is the cylindrical wall of the rod 4, the diameter of which is adapted for this, which normally and positively maintains the whole fingers 7 in this protruding position, this against small return springs 70 which, acting against the head 71, on the contrary, tend to push them back inside the body 6 in order to retract them.

It will already be noted that the rod 4 has a low (distal) end portion 9 with a smaller diameter than that of its main portion which maintains the fingers in their active position of FIG. 3, the difference of the two diameters being slightly greater than 2e. In the rest position (FIG. 3), the heads 71 bear against the rod portion 4 of larger diameter, but just above the transition area with this portion 9 of reduced diameter.

The rod 4 has an annular flange 41 which acts as a shoulder for the base of the frusto-conical proximal (upper) face 60*b* of the body 6. The axial thrust forces exerted on the rod 4 are thus transmitted to the body 6 from top to bottom via this supporting area.

The rod 4 has another annular flange 43 located lower than the first (41) in a cylindrical housing 61 axially made inside the body 6.

The rod portion 4 located between the flanges 41 and 43 bears reference 42. The rod portion 4 located between flange 43 and end portion 9 bears reference 44.

This flange 43 is pierced with small radial bores 63, for example two in number, diametrically opposed to each other (therefore coaxial)—or four of them distributed at 90°—. In each bore 43 is housed a metal pin 8 as a small rod provided with a head, which is fully driven into a bore located opposite, pierced in the body 6.

The rod of these pins 8 has a calibrated section, so as to withstand a given shearing force, and to break when beyond this value (frangible pins).

The housing 61 has a certain axial length in which the flange 43 may move from bottom to top, when said pins are severed until it abuts against the upper bottom 610 of this housing 61.

In the normal rest position (FIG. 3), the flange 43 on the contrary bears against the lower bottom 611 of the housing 61.

It should be noted that the length of the end portion 9 of the rod 4 is a little larger than the axial travel length of the flange 43 in the housing 61.

This device operates as follows.

When operating, the device is in the condition of FIG. 3 (active fingers 7), adapted for supporting the patch during its descent inside the well or the conduit.

The top-to-bottom thrust forces on the maneuvering rod 4 are directly transmitted to the supporting member 6 by the flange 41.

The frangible pins have sufficient strength so as not to break if untimely tensile forces develop during operation, which may for example be related to vibrating phenomena or to buoyancy capable of being exerted on the member 6 (if the well or the conduit contains liquid).

In the case of a difficulty as mentioned above, while the patch is only partly expanded, the withdrawal of the device is accomplished by bottom-to-top traction on the rod 4, a traction symbolized by the arrow F in FIG. 4.

The body 6 therefore moves up, until its fingers 7 which are in a protruding position, come into contact with the lower edge of the non-expanded portion 11 of the patch.

The upward movement is therefore blocked, inducing at the pins 8, sufficient forces for shearing them at the base of their head 8'—which remains in the body 6—.

The maneuvering rod 4 is thereby detached from this body 6 and may move upwards while the body 6 remains immobilized, following the abutment of the fingers 7 against the lower edge of the patch.

The flange 43, which contains the rods 8" of the severed pins, thus moves axially from bottom to top inside the housing 61, until it abuts against the face 610.

During this movement, the end portion of small diameter 9 has arrived opposite to the fingers 7 which have thereby been pushed back towards the inside (arrows j) under the urge from the springs 70, and are retracted in a retracted position which is included in a circular section with a diameter of less than the internal diameter of the non-expanded portion 11 of the patch.

Thus passing through becomes possible, and the assembly may be withdrawn.

The supporting member is not strictly necessary.

It is possible to do without it from the moment that the packer is adapted for supporting its weight during the descent, or when one is working in a horizontal well or slightly tilted in which this weight problem is not posed (or is not crucial).

As regards to the direction of progression of the packer in the "vertical" well illustrated in the figures, there are two solutions:

either from top to bottom, by pushing on the rod which bears the packer;

or from bottom to top by pulling on this rod.

However, it is the first solution (displacement from top to bottom) which is preferred.

The latter has the advantage that the tool may be easily withdrawn in the case of a problem occurring during the laying of the patch, notably in the case of bursting or unexpected deformation of the packer. Indeed, as this is the upper portion of the patch which is expanded, the tool may come out of this widened portion more easily than through a non-expanded portion (which would be the case if one was operating from bottom to top).

Purely as an indication, preferred values of certain parameters according to the invention are given hereafter:
Diameters D=165 mm;
d=140 mm;
Length of the patch=12 m;
Thickness e=6 mm;
Useful length of the packer (=length of one step)=1 m;
Pressure developed in the packer for expanding the patch=500 bars;
Axial tensile force causing failure of the frangible pins=1 ton.

The invention claimed is:

1. A device for laying an expansible lining in a conduit, the device comprising:
   a patch having an initial diameter less than that of the conduit, the patch being configured to deform by radial expansion beyond an elastic limit to an expanded diameter such that it may contact a wall of the conduit,
   an expander tool axially displaceable inside the patch and having a leading distal end and an opposed proximal end, the expander tool configured to cause the radial expansion of the patch to the expanded diameter, and
   a checking member mounted adjacent the proximal end of the expander tool, wherein a section of the checking member is calibrated so that the checking member is capable of passing freely inside the patch when the patch is properly expanded, and wherein the checking member is unable to pass inside the patch when the patch is improperly expanded.

2. The device according to claim 1, wherein said checking member has a general discoidal, conical or biconical shape, with a maximum calibrated diameter $\phi$.

3. The device according to claim 2, wherein said diameter $\phi$ is greater than the initial diameter of the patch, and less than the expanded diameter of the patch.

4. The device according to claim 1, wherein said checking member is crossed by axially directed anti-swabbing apertures.

5. The device according to claim 1, wherein said checking member has a variable diameter, and the checking member is configured to radially retract so as to be able to pass through a non-expanded portion of the patch.

6. The device according to claim 1, wherein the expander tool is an inflatable bladder.

7. The device according to claim 6, wherein said inflatable bladder operates "stepwise", with successive phases of inflation/deflation/advance.

8. The device according to claim 6, wherein said inflatable bladder includes a supporting member cooperating with a distal edge of the patch.

9. The device according to claim 8, wherein said supporting member is configured to center the distal edge of the patch.

10. The device according to any of claim 8 or 9, wherein said supporting member includes retractable supporting fingers, the retraction of which allows it to pass into the patch.

11. The device according to claim 10, wherein said supporting member is connected to the inflatable bladder by a connecting system configured to cause retraction of the fingers when the connecting system is subject to a tensile force which exceeds a given threshold.

12. The device according to claim 11, wherein said connecting system includes frangible pins, the frangible pins having a calibrated mechanical strength.

13. The device according to claim 8, wherein said checking member, said inflatable bladder and said supporting member are borne by a common maneuvering rod.

14. A device for laying an expansible lining in a conduit, the device comprising:
   a patch having an initial diameter less than that of the conduit, the patch being configured to deform by radial expansion beyond an elastic limit to an expanded diameter such that it may contact a wall of the conduit,
   an expander tool axially displaceable inside the patch and having a leading distal end and an opposed proximal end, the expander tool configured to cause the radial expansion of the patch to the expanded diameter, and
   a checking member mounted adjacent the proximal end of the expander tool, wherein a section of the checking member is calibrated so that the checking member is capable of passing freely inside the patch when the patch has the expanded diameter, and wherein the checking member is unable to pass inside the patch when the patch has the initial diameter.

15. The device according to claim 14, wherein said checking member has a general discoidal, conical or biconical shape, with a maximum calibrated diameter $\phi$.

16. The device according to claim 15, wherein said diameter $\phi$ is greater than the initial diameter of the patch, and less than the expanded diameter of the patch.

17. The device according to claim 14, wherein said checking member is crossed by axially directed anti-swabbing apertures.

* * * * *